July 28, 1964 R. E. BLOOMFIELD 3,142,784

PLUG TOGETHER RELAY AND PRINTED CIRCUIT BOARD

Filed Sept. 19, 1960 2 Sheets-Sheet 1

INVENTOR.
Rodger E. Bloomfield

BY C. R. Meland

His Attorney

PLUG TOGETHER RELAY AND PRINTED CIRCUIT BOARD

Filed Sept. 19, 1960 2 Sheets-Sheet 2

INVENTOR.
Rodger E. Bloomfield
BY
C. R. Meland
His Attorney

United States Patent Office 3,142,784 Patented July 28, 1964

3,142,784

PLUG TOGETHER RELAY AND PRINTED CIRCUIT BOARD

Rodger E. Bloomfield, Flint, Mich., assignor to General Motors Corporation, Detroit, Mich., a corporation of Delaware Filed Sept. 19, 1960, Ser. No. 56,739
8 Claims. (Cl. 317—113)

This invention relates to electrical relays and more particularly to a relay that is fabricated by simply plugging components of the relay into a common support member such as a printed circuit board.

One of the objects of this invention is to provide a relay that is compact in size and which is inexpensive to manufacture.

Another object of this invention is to provide a relay that is assembled essentially of three parts that are simply plugged into a supporting panel such as a printed circuit board.

A further object of this invention is to provide a relay that will only operate when the signal voltage applied to the actuating coil is of a predetermined polarity.

Still another object of this invention is to provide a relay which may be quickly and easily calibrated after final assembly by simply bending adjustment tabs.

Further objects and advantages of the present invention will be apparent from the following description, reference being had to the accompanying drawings wherein a preferred embodiment of the present invention is clearly shown.

Figure 1:
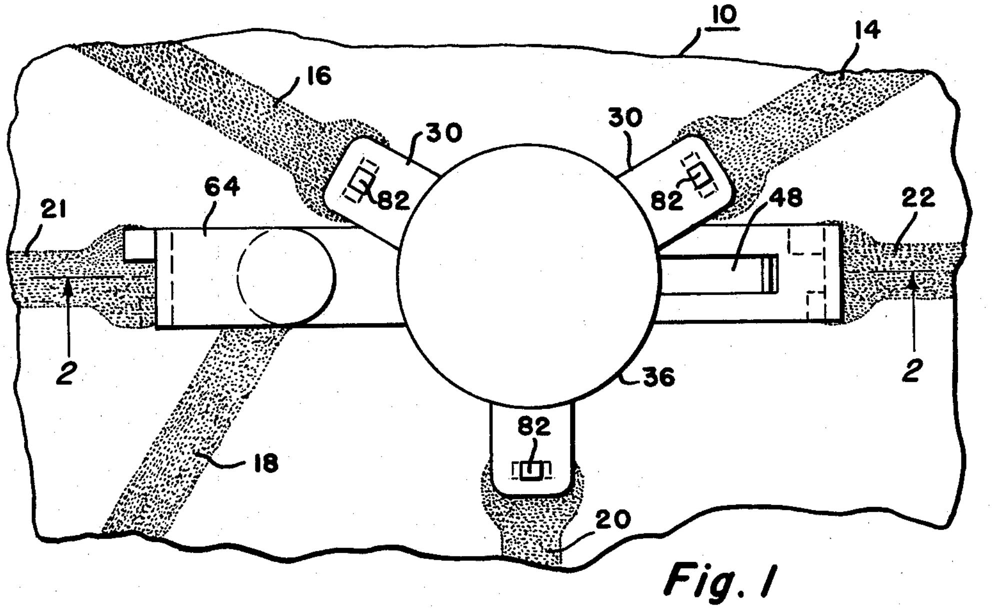
FIGURE 1 is a top view of a relay assembled to a printed circuit board constructed in accordance with the teachings of this invention.

Referring now to the drawings, the reference numeral 10 has been used to generally designate a supporting panel for the component parts of the relay of this invention. The supporting panel has been shown as a printed circuit board comprised of the insulating material 12 which carries the conductors 14, 16, 18, 20, 21 and 22. Insofar as this invention is concerned, it is not material as to how the printed circuit board is manufactured and can be manufactured in any manner known to those skilled in the art. This invention is also applicable to arrangements wherein the conductors are located on the underside of the printed circuit board and also has application to arrangements wherein the member 10 is simply a supporting panel and has no printed circuit function. The particular invention, however, does have advantages where the board 10 is of the printed circuit type.

The components of the relay of this invention are all adapted to be plugged into the panel 10 as will be readily apparent as the description of this invention progresses. The components of the relay of this invention include a coil winding assembly which is generally designated by reference numeral 24. This coil winding assembly includes a support member 26 which is formed of a suitable plastic insulating material and which has a tubular section 28 and radially extending legs 30. Each of the legs 30 has an opening 32, the purpose of which is described hereinafter. The tubular section 28 of the plastic support member 26 carries the coil winding 34 of the coil winding assembly.

Figure 2:
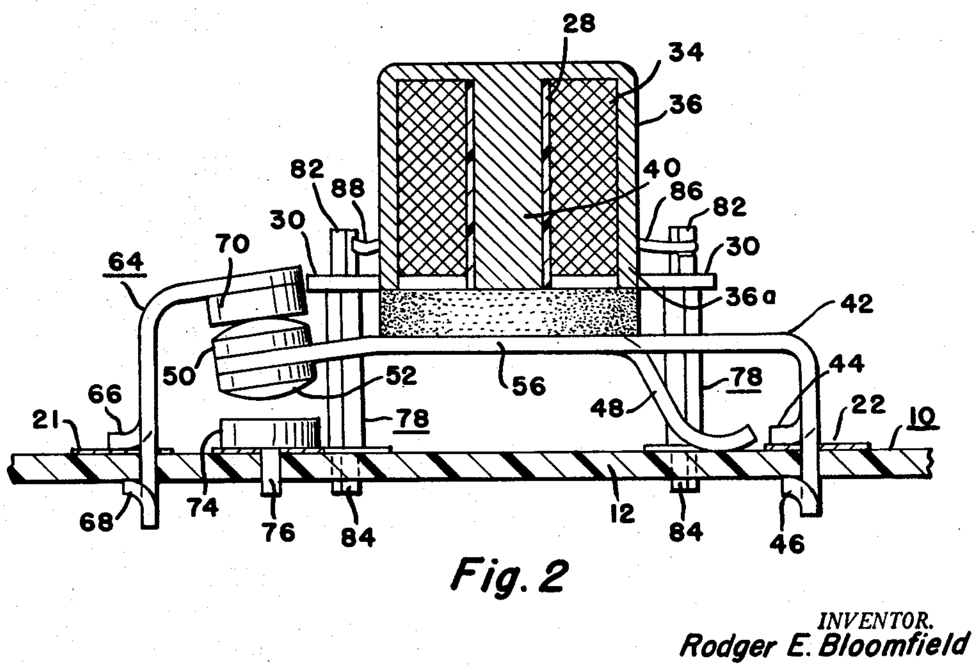
FIGURE 2 is a sectional view taken along line 2—2 of FIGURE 1.

The coil winding assembly 24 cooperates with a frame member generally designated by reference numeral 36 which has the notched out portions 38. The frame member 36 is formed of a magnetic material and has a central cylindrical extension 40 which fits into the tubular member 28 of the support 26. This assembly of the member 36 and the coil winding assembly 24 is better illustrated in the sectional view of FIGURE 2 wherein it is seen that the extension 40 fits within the tubular member 28 and that the coil winding 34 fits within the support member 36. It is also seen that the radially extending legs 30 fit within the notched out portions 38 of the support member 36.

Figure 3:
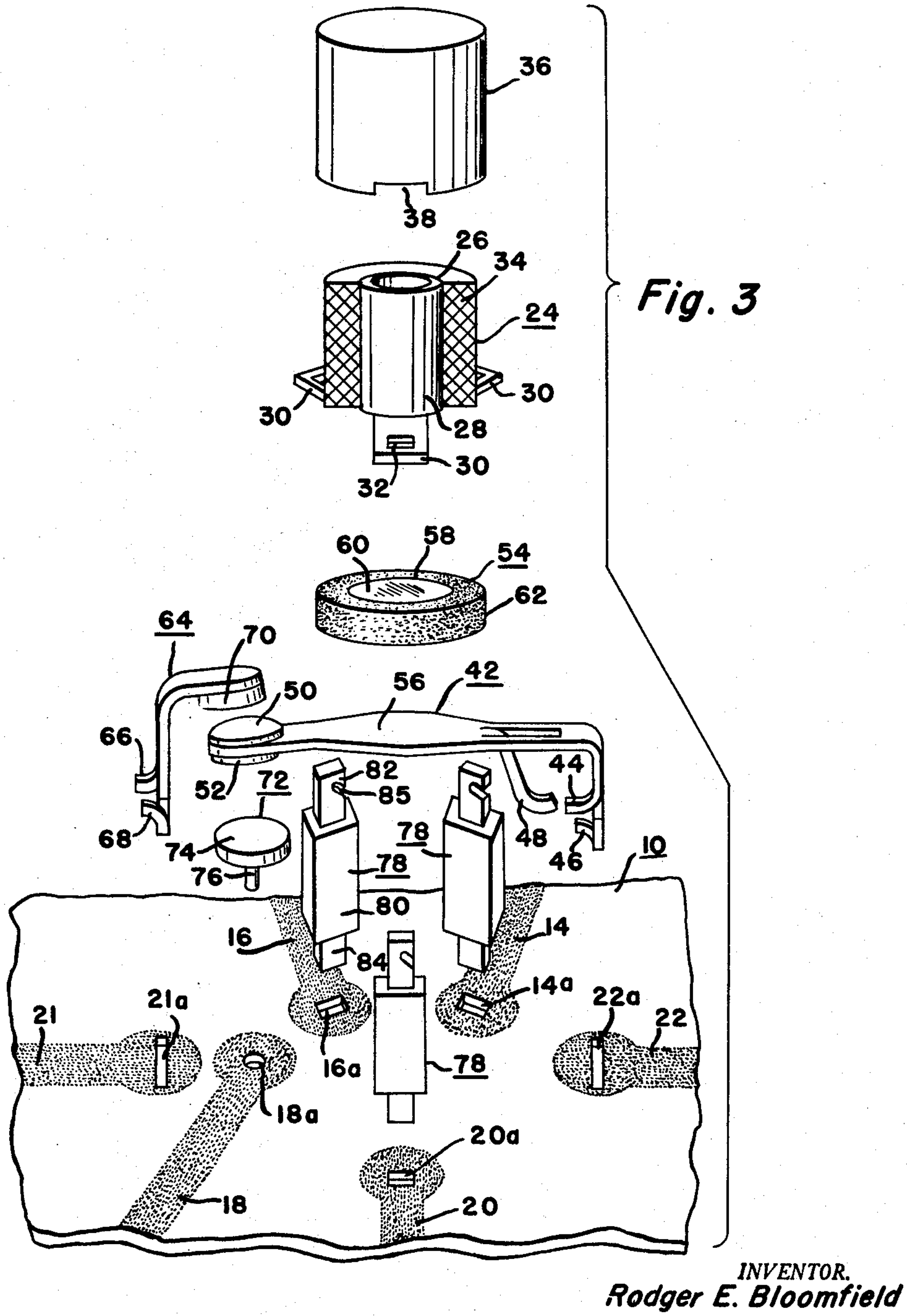
FIGURE 3 is an exploded view of the component parts of the relay of this invention.

The armature of the relay is generally designated by reference numeral 42. This armature is preferably a sheet metal stamping formed of spring-like material such as beryllium copper. The armature 42, as can be seen, is generally L-shaped and is formed with struck out tabs 44 and 46. In addition, the armature is formed with a struck out stop tab 48 which extends generally downwardly from the main section of the armature. The armature 42 carries the contacts 50 and 52 and also carries a ceramic magnet generally designated by reference numeral 54 which is cemented to the section 56 of the armature as by use of a rubber-base cement. The ceramic magnet 54 is an integral disk shaped unit but a line 58 has been drawn on the magnet in FIGURE 3 in order to illustrate that the sections of the magnet are of different magnetic polarities. The center section 60 of the magnet has a north polarity, whereas the outer section 62 of the magnet has a south polarity. The magnet may be provided with these polarities by placing it in a suitable magnetizing fixture which will render the center section a north polarity and the outer annular section a south polarity.

The relay of this invention includes a fixed contact assembly generally designated by reference numeral 64 which has the outwardly struck tabs 66 and 68 and which carries an electrical contact 70. The other fixed contact of the relay is generally designated by reference numeral 72 and includes a contact portion 74 and a cylindrical section 76 that is plugged into opening 18*a* formed in the printed circuit board 10.

In addition to the components above described, the relay of this invention makes use of the terminal posts 78 which are formed of a metal material. Each post 78 has a generally rectangular section 80 and projecting parts of reduced cross section 82 and 84. The sections 82 and 84 are also of rectangular cross section and it is seen that the section 82 has a notch 85 cut therein.

In manufacturing the relay of this invention, the support member 26 is wound with the coil member 34 and the frame 36 is then pressed onto the assembly 24. After this has been accomplished, the section 82 of the terminal posts 80 are fitted into the openings 32 formed in the support member 26.

In assembling the armature, the ceramic magnet is cemented to the sheet metal stamping 42 and the contacts 50 and 52 are riveted to this sheet metal stamping. The fixed contact assembly 64 is made from a sheet metal stamping and the contact 70 is riveted thereto.

When the parts have been assembled as just described, it can be seen that the lower rectangular sections 84 of the posts 78 may be simply slipped into the openings 14*a*, 16*a* and 20*a* which pass through the printed circuit board 10 and through the printed circuit conductors 14, 16 and 20. The lead wires 86 and 88 of the coil winding 34 may then be slipped into the notches 85 of two of the posts 78 and soldered thereto. It will, of course, be appreciated that this connection of the lead wires to the posts may be made prior to the plugging in of the coil winding assembly to the printed circuit board 10. It can be seen that with this arrangement the coil winding circuit is from the printed circuit conductors 14 and 16. It will be appreciated, of course, that the posts 78 not only serve to support the coil winding assembly, but also serve as electrical conductors between the printed circuit conductors 14 and 16 and the coil winding 34.

The armature 42 is assembled to the supporting panel 10 by passing the lower tab 46 through the opening 22*a* formed in the printed circuit board 10 and the conductor 22. As the lower tab is forced inward, it then will spring outward when it clears the bottom of the board. The amount of force the armature works down against is determined by the position of the adjusting tab 48 and it may be bent after the complete relay has been assembled to give the desired characteristic.

The fixed contact assembly 64 is assembled in a similar manner to the armature 42 in that the tab 68 is pushed downwardly through the opening 21*a* formed in the supporting panel 10. As the tab clears the underside of the panel 10, it will snap outwardly to the position in FIGURE 2 with the tab 66 contacting the top side of the panel. The fixed contact assembly 74 is assembled to the supporting panel 10 by simply slipping the portion 76 into the cylindrical opening 18*a* formed in the printed circuit board 10. When all of the parts have been plugged into the supporting panel 10, the relay will take the configuration illustrated in FIGURE 2 and is now in an operative condition. It is pointed out once more that the adjusting tab 48 can be bent to adjust the amount of force the armature must work against when moving downwardly.

As pointed out hereinbefore, the printed circuit conductors need not be on the top side of the panel 10, but rather could be on the underside of the panel, if so desired. It is also important to note that the panel 10 need not be a printed circuit board since the various components of the relay could be wired up with conventional conductors. It will also be appreciated that certain of the parts that plug into the printed circuit conductors may be soldered thereto, if desired.

In the operation of this relay it can be seen that the control signal for operating the relay must be applied to the printed circuit conductors 14 and 16. In the normal condition of the relay the contact 50 engages the contact 70 to therefore complete a circuit between the printed circuit conductor 21 and the printed circuit conductor 22 via the contact assembly 64 and the armature 42. If a voltage is connected with the printed circuit conductors 14 and 16 of such a polarity as to render the center section 40 a north pole and to render the outer cylindrical section 36*a* a south pole, it will be apparent the permanent magnet 54 will be repelled away from the shell member 36 to cause an opening of the contacts 50 and 70 and a closure of the contacts 52 and 74. It is pointed out here that if the voltage is of a reverse polarity such that the center section were magnetized a south pole and the outer cylindrical section 36*a* a north pole, the contacts 50 and 70 would remain in engagement since the armature 42 would not be repelled away from the maget shell 36 but rather would be attracted toward it. It thus can be seen that the relay is a polarized one in that the contacts 50 and 70 will only separate when a voltage is applied to the conductors 14 and 16 of the required polarity. It will also be apparent that when no voltage is applied to the coil winding 34, the magnet 54 will be attracted toward the magnetic shell 36 to maintain the contacts 70 and 50 in a closed position.

It can be seen from the foregoing that a relay has been provided which is readily assembled by simply plugging parts into a supporting panel 10. The relay may be fabricated so that only three parts are plugged into the panel 10, that being the armature assembly 42, the fixed contact assembly 64, and the coil winding assembly with its attached terminal posts 78. It will also be appreciated that the relay of this invention is a polarized one in that the armature is only actuated when a voltage of the correct polarity is applied to the actuation coil 34.

It is to be pointed out that the relay control circuit for this relay is via the printed circuit terminals 14 and 16. The circuit controlled by the relay may be from printed circuit conductor 21 to printed circuit conductor 22 when contacts 70 and 50 are in engagement and from printed circuit conductor 22 to printed circuit conductor 18 when the contacts 52 and 74 are in engagement. In the particular embodiment illustrated, the printed circuit conductor 20 serves no useful function and it is apparent that this conductor 20 could be eliminated with one of the posts 78 being fitted directly in an opening formed in the panel 10.

While the embodiments of the present invention as herein disclosed constitute preferred forms, it is to be understood that other forms might be adopted.

What is claimed is as follows:

1. A relay comprising, a supporting panel, a coil winding assembly supported by said supporting panel, a fixed contact supported by said supporting panel, and an armature formed of resilient sheet metal material having a contact cooperating with said fixed contact, an opening in said supporting panel, an integral portion of said armature passing through said opening, said armature having integral tabs engaging opposite sides of said supporting panel, said armature further including an integral stop tab that is engageable with said supporting panel.

2. A relay comprising, a coil winding assembly including a coil winding and a member formed of magnetic material, said member formed of magnetic material having first and second radially spaced sections that are of different magnetic polarities when said coil winding is connected with a source of voltage, an armature member carrying an electrical contact and a permanent magnet, said magnet having first and second surfaces of opposite magnetic polarities which are positioned to engage the magnetic member of the coil winding assembly, and fixed contact means cooperating with a contact carried by said armature.

3. A relay comprising, a coil winding assembly including an actuating coil and a member formed of magnetic material having spaced sectors that are magnetized with opposite polarities when the actuating coil is energized from a voltage source, an armature member including a member formed of metal material and a permanent magnet, said permanent magnet being aligned with said coil winding assembly and having first and second adjacent surfaces opposite magnetic polarity whereby said armature member is repelled away from said coil winding assembly when said actuating coil is connected with a voltage of a predetermined polarity.

4. A relay comprising, an actuating coil assembly, a fixed contact, a supporting panel, and an armature formed of sheet metal material having integral outwardly struck tabs engaging opposite sides of said supporting panel, said armature assembly carrying an electrical contact that cooperates with said fixed contact and having an integral downwardly struck stop tab that is engageable with said supporting panel.

5. A relay comprising, a coil winding assembly including an actuating coil and a member formed of magnetic material that has first and second sectors that are magnetized with opposite magnetic polarities when said actuating coil is connected with a voltage source, a fixed contact means, an armature assembly including a sheet metal part to which is bonded a ceramic magnet, said magnet having inner and outer adjacent surfaces of opposite magnetic polarities which cooperate with the magnetic member of said coil winding assembly, and a contact carried by said sheet metal member cooperating with said fixed contact means.

6. A relay comprising, a printed circuit board formed of insulating material having a plurality of printed circuit conductors, a plurality of openings in said printed circuit board passing through said conductors, a plurality of conductive posts having one of their ends fitted respectively within the openings in said conductors and extending in one direction from said printed circuit board, a unitary support member formed of insulating material having a plurality of radially extending arms and a tubular section extending substantially normal to said arms, each of said arms having an opening which receives an opposite end of said conductive posts whereby said support member is supported by said posts, an electromagnet including a coil winding wound on the exterior of said tubular section of said support member, said electromagnet including a magnetic member disposed within said tubular section, at least one of the end conductors of said coil winding being connected with one of said conductive posts, and an armature disposed adjacent one end of said electromagnet.

7. The relay according to claim 6 where the armature is supported by the printed circuit board and carries a permanent magnet which cooperates with said electromagnet.

8. The relay according to claim 6 where the electromagnet is formed of a coil winding wound on said support member and a unitary magnetic part having a section disposed within the tubular section of said support member and having an annular section enclosing said coil winding.

References Cited in the file of this patent

OTHER REFERENCES

| | | |
|---|---|---|
| 1,951,327 | Dorr et al. | Mar. 13, 1934 |
| 2,423,116 | Price | July 1, 1947 |
| 2,442,016 | Poole | May 25, 1948 |
| 2,444,198 | Hasselhorn | June 29, 1948 |
| 2,668,208 | Lamb | Feb. 2, 1954 |
| 2,832,921 | Horman | Apr. 29, 1958 |
| 2,915,681 | Troy | Dec. 1, 1959 |
| 2,916,585 | Moyer | Dec. 8, 1959 |

OTHER REFERENCES

"Phil-Trol Data," Phillips Control Corp. advertisement, published in Electronics, February 1955, page 104.